United States Patent
Saarinen et al.

(10) Patent No.: US 11,750,556 B2
(45) Date of Patent: Sep. 5, 2023

(54) CREATING A PSEUDONYM FOR REQUESTING A NETWORK SLICE

(71) Applicant: Telefonaktiebolaget LM Ericsson (publ), Stockholm (SE)

(72) Inventors: Pasi Saarinen, Spånga (SE); Prajwol Kumar Nakarmi, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/570,793

(22) Filed: Jan. 7, 2022

(65) Prior Publication Data

US 2022/0210121 A1    Jun. 30, 2022

Related U.S. Application Data

(63) Continuation of application No. 16/651,975, filed as application No. PCT/EP2018/075381 on Sep. 19, 2018, now Pat. No. 11,228,562.

(Continued)

(51) Int. Cl.
*H04L 61/30*    (2022.01)
*H04W 12/00*    (2021.01)
(Continued)

(52) U.S. Cl.
CPC .......... *H04L 61/30* (2013.01); *H04L 41/0803* (2013.01); *H04L 63/0414* (2013.01);
(Continued)

(58) Field of Classification Search
CPC ... H04L 61/30; H04L 41/083; H04L 63/0414; H04W 12/009; H04W 12/75; H04W 8/26; H04W 12/06
See application file for complete search history.

(56) References Cited

U.S. PATENT DOCUMENTS

2017/0303259 A1    10/2017  Lee
2018/0270744 A1    9/2018   Griot
(Continued)

FOREIGN PATENT DOCUMENTS

WO    2017/058067    4/2017
WO    2017/063708    4/2017

OTHER PUBLICATIONS

International Search Report and Written Opinion issued in International Application No. PCT/EP2018/075381 dated Mar. 11, 2019 (19 pages).

(Continued)

*Primary Examiner* — Duc C Ho
(74) *Attorney, Agent, or Firm* — Rothwell, Figg, Ernst & Manbeck, P.C.

(57)    ABSTRACT

A wireless device requests a network slice from a network by, first, identifying at least one network slice to be requested. Based on a mapping method that is specific to the wireless device, the wireless device forms a slice pseudonym for the or each network slice to be requested. The wireless device then transmits a request message to the network, wherein the request message comprises the or each slice pseudonym. The network node receives the request message sent by the wireless device, wherein the request message comprises at least one slice pseudonym. Based on a mapping method that is used by the wireless device and that is specific to the wireless device, the network node identifies at least one requested network slice from the or each received slice pseudonym. The network node then permits use of the requested network slice.

20 Claims, 11 Drawing Sheets

Related U.S. Application Data

(60) Provisional application No. 62/565,249, filed on Sep. 29, 2017.

(51) Int. Cl.
*H04L 41/0803* (2022.01)
*H04L 9/40* (2022.01)
*H04W 8/26* (2009.01)
*H04W 12/06* (2021.01)
*H04W 12/75* (2021.01)

(52) U.S. Cl.
CPC .......... *H04W 8/26* (2013.01); *H04W 12/009* (2019.01); *H04W 12/06* (2013.01); *H04W 12/75* (2021.01)

(56) References Cited

U.S. PATENT DOCUMENTS

| | | |
|---|---|---|
| 2018/0324583 A1 | 11/2018 | Nair |
| 2018/0352501 A1* | 12/2018 | Zhang ................ H04W 48/18 |
| 2019/0053147 A1 | 2/2019 | Qiao |
| 2019/0289475 A1 | 9/2019 | Hedman |
| 2019/0357129 A1 | 11/2019 | Park |

OTHER PUBLICATIONS

Xumin Huang et al., "Software Defined Networking With Pseudonym Systems for Secure Vehicular Clouds", IEEE Access, vol. 4 (Apr. 29, 2016) pp. 3522-3534.

Emmanouil Vasilomanolakis et al., "On the Security and Privacy of Internet of Things Architectures and Systems", 2015 International Workshop on Secure Internet of Things (SIOT), IEEE, (Sep. 21, 2015) pp. 49-57.

Huawei, "5G Network Architecture a High-Level Perspective", (Dec. 31, 2016) 21 pages.

Emanuel Fonseca et al., "Support of Anonymity in VANETs—Putting Pseudonymity into Practice", IEEE Wireless Communications and Networking Conference, (Mar. 1, 2007) pp. 3402-3407.

3GPP TR 33.899 V1.3.0 (Aug. 2017), 3rd Generation Partnership Project; Technical Specification Group Services and System Aspects; Study on the security aspects of the next generation system (Release 14) (Aug. 2017) 4 pages.

Taewhan Yoo, "Network Slicing Architecture for 5G Network", 2016 International Conference on Information and Communication Technology Convergence (ICTC), IEEE, (Oct. 19, 2016) pp. 1010-1014.

3GPP TS 23.501 V1.3.0 (Sep. 2017), 3rd Generation Partnership Project; Technical Specification Group Services and System Aspects; System Architecture for the 5G System; Stage 2 (Release 15) (Sep. 2017) 174 pages.

3GPP TS 23.502 V1.2.0 (Sep. 2017) 3rd Generation Partnership Project; Technical Specification Group Services and System Aspects; Procedures for the 5G System; Stage 2 (Release 15) (Sep. 2017) 165 pages.

* cited by examiner

CREATING A PSEUDONYM FOR REQUESTING A NETWORK SLICE

CROSS-REFERENCE TO RELATED APPLICATIONS

This application is a continuation of Ser. No. 16/651,975, filed on Mar. 27, 2020 (now U.S. Pat. No. 11,228,562, on Jan. 18, 2022), which is a 35 U.S.C. § 371 National Stage of International Patent Application No. PCT/EP2018/075381, filed Sep. 19, 2018, which claims priority to U.S. provisional application No. 62/565,249, filed on Sep. 29, 2017. The above identified applications and publications are incorporated by reference.

TECHNICAL FIELD

This relates to a method performed by a wireless device for requesting use of a network slice from a network. It also relates to wireless devices, a network node, a method performed by a network node, a User Equipment, a computer program product, and non-transitory storage media.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP is standardizing the 5G system. This is the next generation mobile network. A rough division of the 5G system splits it into three parts. The User Equipment (UE) that is operated by the subscriber. This contains both the modem or the Mobile Equipment (ME) and some tamper resistant secure hardware component that stores the subscriber credentials of the user. Examples of the tamper resistant hardware component may be a standard, removable UICC, or an embedded UICC (eUICC), or even an integrated UICC (iUICC). Another part of the 5G system is the Visited Network (VN) which operates the base station (gNB) and the Access & Mobility management function (AMF) that the UE connects to. In relation to LTE the gNB is the 5G version of eNB and the AMF is roughly the 5G version of the MME. The last part of the 5G system is the Home Network (HN). This is the network owned by the user's operator, i.e. the operator with which the user has a subscription. In case of roaming the HN and VN are logically two distinct networks while otherwise they may be part of the same network.

The 5G system will support network slices. A network slice is a logical network that provides specific network capabilities and network characteristics. Network slices are a way to separate resources between different types of services and subscribers. The user's operator provisions the tamper resistant secure hardware component of the UE with information about which slices the user is allowed to connect to. The UE is then able to select which of its allowed slices it wants to use.

To select network slices Network Slice Selection Assistance Information (NSSAI) is used.

The NSSAI and related terms are as follows: (1) "NSSAI" is a collection of at most 8 S-NSSAIs; (2) "S-NSSAI" is Single-NSSAI that identifies a network slice; (3) "Allowed NSSAI" is what identifies network slices that the UE is allowed to use; (4) "Configured NSSAI" is the NSSAI provisioned in the UE; and (5) "Requested NSSAI" is what UE provides to the network, e.g., at Registration procedure.

The S-NSSAI is composed of SST (Slice/Service Type) and SD (Slice Differentiator). The SST refers to the expected Network Slice behavior in terms of features and services while the SD is optional information that compliments the Slice/Service type(s) to differentiate amongst multiple Network Slices of the same Slice/Service type.

Currently there exists only three SST values while there may exist multiple SDs for each SST.

According to the current state of the 5G standard (which is in progress), the Requested NSSAI exists not only in the non-access stratum (NAS) layer, but also in the radio resource control (RRC) layer. The NAS layer provides communication between the UE and the AMF (transparently via the gNB), and the RRC layer provides communication between the UE and the gNB. While it is almost certain that the NAS layer will contain Requested NSSAI, the working groups in the 3GPP are still discussing whether the RRC layer will contain the Requested NSSAI or not. In this document, where it is necessary to distinguish between them, the terms Requested NSSAI-NAS and Requested NSSAI-RRC are used to refer to the Requested NSSAI in the NAS layer and in the RRC layer respectively.

3GPP TS 23.502 V1.0.0, in paragraph 4.2.2.2.3 3, describes a Registration procedure with AMF relocation. As can be seen at step 2 in FIG. 4.2.2.2.3-1, the initial AMF only authenticates the UE. It does not establish a NAS security context with the UE. The motivation for adding authentication without setting up a NAS security context in Step 2 was a strategy to mitigate DoS towards the target AMF.

As can be seen at steps 3 and 4 in FIG. 4.2.2.2.3-1, the Initial AMF has procedures defined with the UDM and NSSF to retrieve the Allowed NSSAI for the UE.

As can be seen at step 9 in FIG. 4.2.2.2.3-1, the target AMF again authenticates the UE, and establishes a NAS security context with the UE.

It is the Requested NSSAI that is sent by UE over-the-air that causes an issue of privacy.

Subscriber privacy is an issue in the existing LTE system. For example, it is possible for attackers to track specific subscribers by monitoring the air interface and recognizing when that subscriber's International Mobile Subscriber Identity (IMSI) is sent. The 5G system is being designed to increase subscriber privacy. For example, the Subscription Permanent Identifier (SUPI) can be sent in an encrypted form to the home network. This encryption protects the subscriber from being tracked as described above. Example of SUPI is IMSI (as e.g. defined in 3GPP TS 23.003 V 15.1.0) and NAI or any future 5G generalization of IMSI.

Similarly, just as it is a privacy issue if a single subscriber can be tracked, there is a privacy issue if a certain group can be tracked. When the Requested NSSAI is sent by UE over-the-air it leaks privacy sensitive information. For example, if a small group of people are the only ones with access to a specific slice, an attacker observing an S-NSSAI associated with this slice knows that someone from this group is present in the area of observation.

Therefore, exposure of NSSAI over-the-air is a privacy concern. As there are few possibilities for value of the SST part of NSSAI it is expected that this part is less privacy sensitive as many users will use the same SST. The main issue is expected to be the SD part which could be unique to a single individual or a small group of people.

SUMMARY

An object of the present disclosure and embodiments is to provide solutions to these or other challenges. More specifically, it is an object of some embodiments to allow a UE to indicate its selected or requested slices to a network without leaking privacy sensitive information over-the-air.

There is disclosed a method performed by a UE for requesting a network slice from a network without revealing the requested network slice while sent over-the-air, the method comprising: obtaining a UE specific slice-pseudonym for the requested network slice; sending the UE specific slice-pseudonym to the network.

The UE specific slice-pseudonym shall be interpreted as a pseudonym for a slice and that this pseudonym is associated with a specific UE. In other words, it is not meant to mean that it is a pseudonym for the slice which pseudonym is only used internally in the UE.

Obtaining the UE specific slice-pseudonym for the requested network slice may further comprise the UE and its home network (HN) agreeing on a mapping of a UE specific slice-pseudonym from and to a network slice.

The mapping of a UE specific slice-pseudonym from and to a network slice may further comprise the HN provisioning the mapping at the UE. A device/function/node in the HN may be a separate privacy node or Unified Data Management node, UDM. The UDM is an exemplary node in case the agreement is done by being provisioned to a USIM in a UICC/eUICC/iUICC in the UE.

A network slice may be represented as Single Network Slice Selection Information (S-NSSAI).

The UE may be for example a mobile phone, a laptop, a tablet, a TV, a set-top box and a camera. The UE may also be a wearable, such as a watch, virtual reality glasses/goggles, and a fitness tracker in the form of e.g. an armband, waistband/belt and a shoe equipped with a telematics unit. The UE may also be an embedded device/telematics unit, e.g. in a 3D printer, a robot, weather station, white goods (such as a refrigerator and robot vacuum cleaner) or a vehicle (such as a fleet management system and infotainment system in the dashboard of a car or truck).

There are, proposed herein, various embodiments which address one or more of the issues disclosed herein.

According to one embodiment, there is provided a method performed by a wireless device for requesting use of a network slice from a network. The method comprises: identifying at least one network slice to be requested; based on a mapping method that is specific to the wireless device (i.e. each UE has their own mapping instead of having a shared mapping over multiple UEs), forming a slice pseudonym/network slice pseudonym for the or each network slice to be requested; and transmitting a request message to the network, wherein the request message comprises the or each slice pseudonym.

The mapping method may comprise a method for generating a slice pseudonym for each network slice that is allowed for use by the wireless device.

The mapping method may comprise a one-to-one mapping step that is known in advance to the wireless device for each network slice that is allowed for use by the wireless device.

Specifically, the mapping method may comprise performing a one-to-one mapping between a network slice identifier of the network slice to be requested and the slice pseudonym for said network slice to be requested, wherein the slice pseudonym for said network slice to be requested is specific to the wireless device. Alternatively, the mapping method may comprise: performing a one-to-one mapping between a network slice identifier of the network slice to be requested and a slice number associated with said network slice to be requested, wherein the association between network slice identifiers of the network slices and associated slice numbers is specific to the wireless device, determining a next adjacent slice number in an ordered list of slice numbers associated with network slices that are allowed for use by the wireless device, and selecting a slice pseudonym as a number between the slice number associated with said network slice to be requested and said next adjacent slice number. Alternatively, the mapping method may comprise: performing a one-to-one mapping between a network slice identifier of the network slice to be requested and an index value, and generating the slice pseudonym, for said network slice to be requested, from said index value by adding to the index value a product of a random integer and a predetermined multiplicand that is greater than or equal to the number of network slices that are allowed for use by the wireless device.

The wireless device may be a UE, for example in the form of a mobile phone, a laptop, a tablet, a TV, a set-top box and a camera. The UE may also be a wearable, such as a watch, virtual reality glasses/goggles, and a fitness tracker in the form of e.g. an armband, waistband/belt and a shoe equipped with a telematics unit. The UE may also be an embedded device/telematics unit, e.g. in a 3D printer, a robot, weather station, white goods (such as a refrigerator and robot vacuum cleaner) or a vehicle (such as a fleet management system and infotainment system in the dashboard of a car or truck).

According to another embodiment, there is provided a method performed by a network node for allocating a network slice to a wireless device. The method comprises: receiving a request message relating to a request sent by a wireless device, wherein the request message comprises at least one received slice pseudonym; and, based on a mapping method used by the wireless device that is specific to the wireless device, identifying at least one requested network slice from the or each received slice pseudonym.

The mapping method may comprise a one-to-one mapping step that is known in advance to the wireless device.

According to another embodiment, there is provided a method performed by a network node for allocating a network slice to a wireless device. The method comprises: receiving a request message sent by a wireless device, wherein the request message comprises at least one received slice pseudonym; notifying a second network node of the or each received slice pseudonym and an identifier of the wireless device; receiving from the second network node information identifying at least one requested network slice; and providing the wireless device with access to the or each requested network slice.

The network node may be a node of a network visited by the wireless device, and the second network node may then be a node of a home network of the wireless device.

Certain embodiments may provide one or more of the following technical advantage(s), namely solving the problem of how the UE can indicate its selected or requested slices to a network without leaking privacy sensitive information over-the-air. It has next to no overhead of computation, no increase in number of messages transmitted and is easy to implement. Further, certain techniques to select privacy sensitive slices might be unusable due to regulation. Some embodiments do not suffer from such regulatory issues.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the Appendix, which further describes the context of the subject matter.

The 5G system supports network slices. A network slice is a logical network that provides specific network capabilities and network characteristics. Network slices are a way to separate resources between different types of services and subscribers. Slices can be optimized by characteristics including latency or bandwidth requirements. The slices may be isolated from each other in the control and user planes as well supported use case.

According to the 3GPP TS 23.501 V1.3.0, the selection of slice is done by the UE sending its Requested NSSAI to the Visited Network (VN).

As said before, the slice that a UE selects could be privacy sensitive. For example, if law enforcement personnel get access to a special law-slice, meaning that an S-NSSAI for the special law-slice is sent over-the-air during the process, then an attacker seeing this S-NSSAI over-the-air would know that some law enforcement personnel are nearby.

One possible technique that attempts to solve the NSSAI privacy issue is that the UE sends privacy sensitive Requested NSSAI only when the UE and the AMF have an established NAS security context. This means that the Requested NSSAI could be sent to the VN using NAS protected message, i.e. using NAS layer encryption. This technique is depicted in FIG. 1, which shows a privacy sensitive Requested NSSAI being sent to the VN after a NAS Security context is available and in use.

Figure 1:
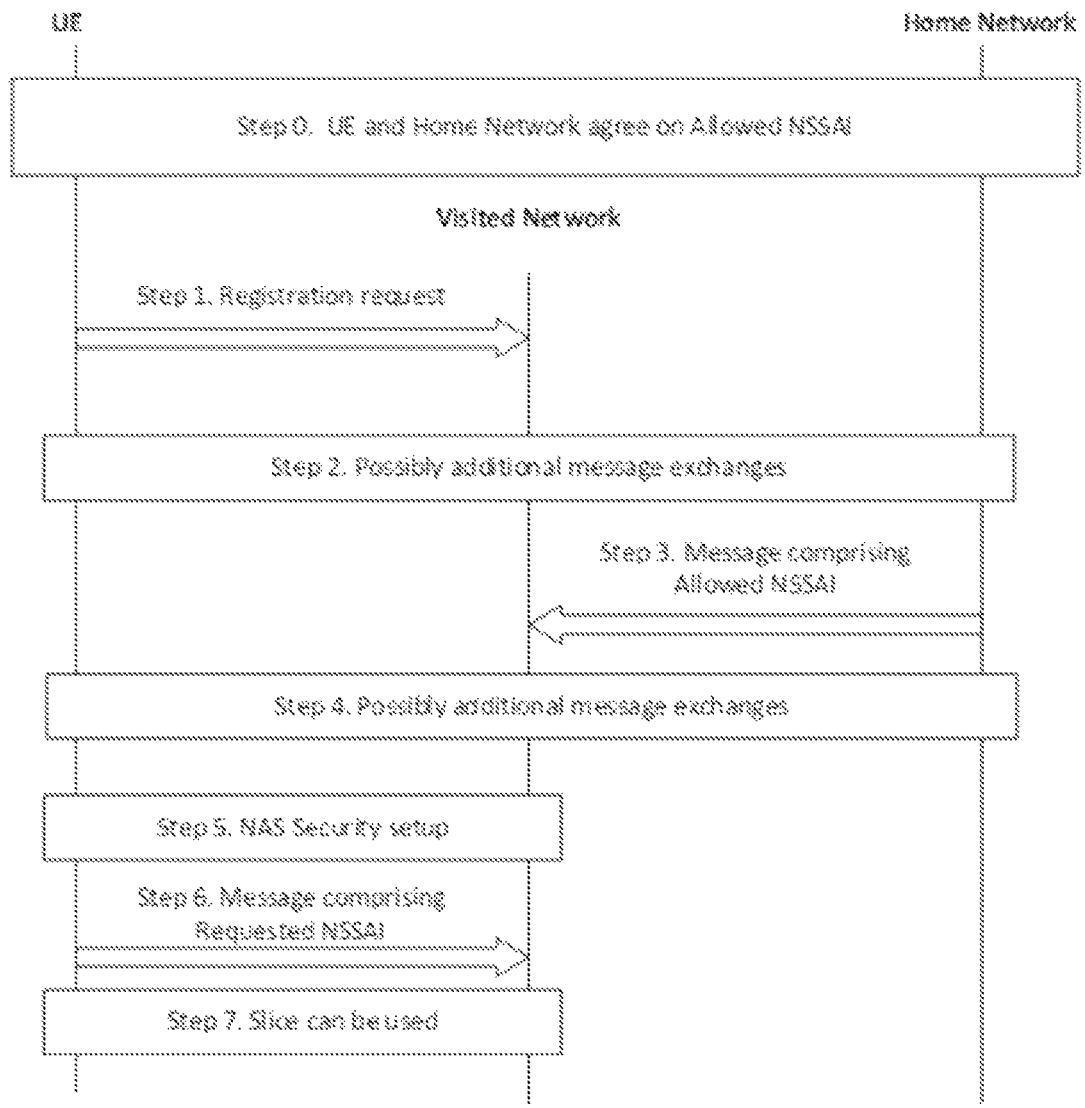
FIGS. 1 and 2 illustrate possible methods by which the UE could send information about the Requested NSSAI.

In step 0 of FIG. 1, the UE and the Home Network (HN) share the information about which slices the UE is allowed to access by agreeing on the Allowed NSSAI. Then in Step 1 the UE registers to the network using the Registration Request message. What follows in Step 2 to Step 4 is possible message exchanges between the UE and the VN and between the VN and the HN and between the UE and the HN through the VN. These exchanges could for example be part of authentication or other communication. At some point in these exchanges (Step 3) the HN sends the Allowed NSSAI for this UE to the VN. This could for example be after the HN has authenticated the UE or as soon as the HN knows the identity of the UE. At Step 5 the UE has been authenticated and the network sets up a NAS Security context and starts using it for encryption of the NAS communication. At this point, in Step 6, the Requested NSSAI can be sent from the UE to the VN protected by encryption in a NAS message. The selected slice can then be used between the UE and the VN (Step 7).

Note that this technique allows sending the Requested NSSAI that are not privacy sensitive in an unprotected form over-the-air, i.e. in the messages in Step 1 to Step 4. There are multiple issues with this technique:

(1) Leakage of privacy sensitive information: The fact that privacy sensitive slices and non-privacy sensitive slices are treated differently is a privacy issue in itself. For example it might identify people that are using privacy sensitive slices. This could be a limited set of people which would compromise their privacy.

(2) Late slice selection: Privacy sensitive slices cannot be selected before a NAS Security context is established and ready to be used for encryption. This will cause a delay before service can be provided.

(3) Complex administration/management: It requires some party, most probably the home network (HN), to decide which NSSAI are privacy sensitive and not. It also requires that the UE or software applications are aware of the privacy sensitivity of the slice.

To remedy some of the issues in the previous technique, there is a second possible technique. The second technique is to never send Requested NSSAI in the clear. The second technique does not suffer from the issue of leaking privacy sensitive information and does not require complex management as the previous. Note that this second technique still suffers from the late slice selection issue but the impact is larger as not even non-privacy sensitive slices can be selected before a NAS Security context exists and is in use.

Another possible technique is that the UE sends the Requested NSSAI in an encrypted form. In other words, the UE sends encrypted Requested NSSAI. This technique is depicted in FIG. 2, which shows a requested NSSAI being sent via the HN to the VN encrypted in the Registration request.

Figure 2:
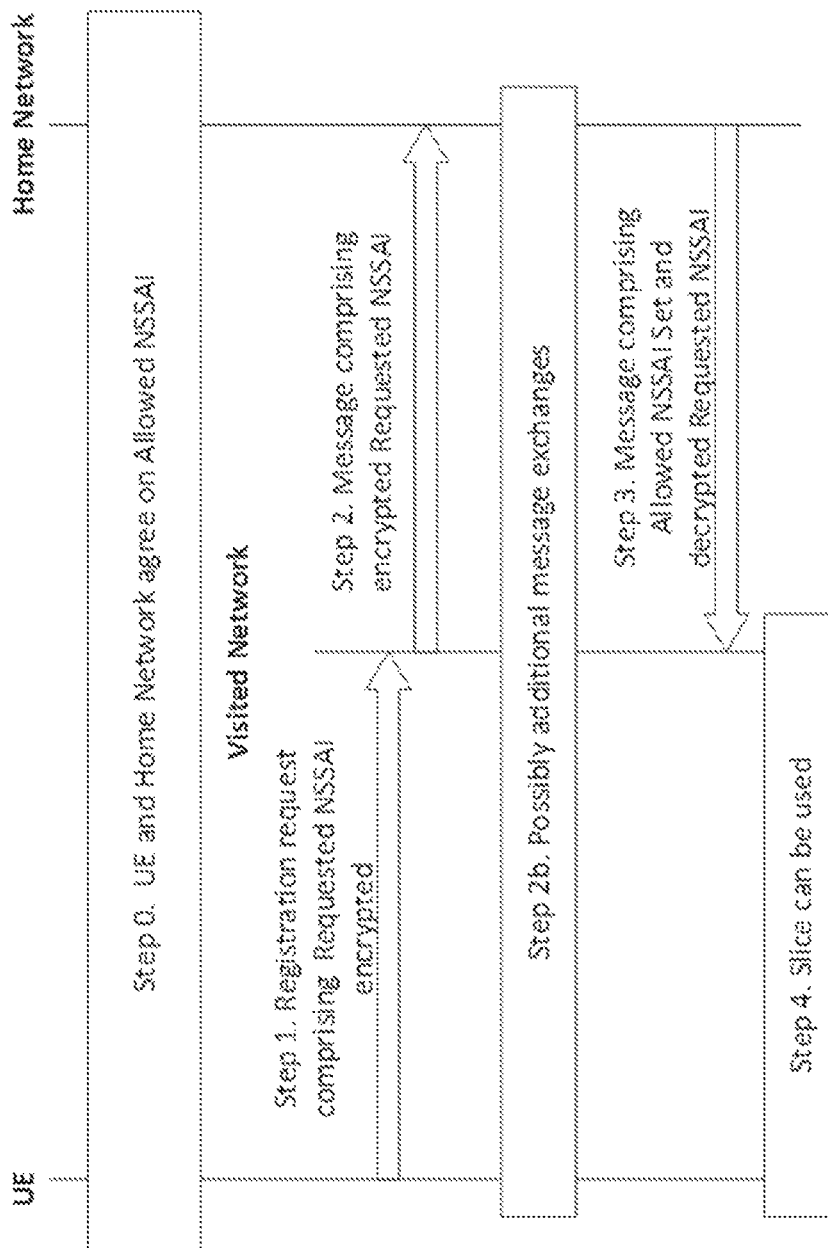

As shown in FIG. 2, the UE and the HN share the information about which slices the UE is allowed to access. In other words, the UE and the HN have agreed on Allowed NSSAI (Step 0). While registering to the network, the UE sends the encrypted Requested NSSAI to the network (Step 1). Here, encrypting the Requested NSSAI could mean that the S-NSSAIs in the Requested NSSAI are encrypted individually or all together, or the SST and the SD part of each S-NSSAIs are encrypted individually, or only the SD part of each S-NSSAIs are encrypted individually. The UE indiscriminately encrypts the Requested NSSAI using the HN's public key and an asymmetric encryption scheme, e.g., elliptic curve integrated encryption scheme (ECIES). A modification of this method would be to encrypt the Requested NSSAI using symmetric encryption instead. The key for such encryption could for example be derived from the permanent subscription key. This means that the Requested NSSAI is encrypted between the UE and the HN such that the VN cannot decrypt the encrypted Requested NSSAI. Therefore, the VN passes on the encrypted Requested NSSAI to the HN (Step 2). The HN decrypts the encrypted Requested NSSAI and sends the decrypted Requested NSSAI to the VN (Step 3). The VN is then able to allocate or selected the slice as indicated in the Requested NSSAI. The selected slice can then be used between the UE and the VN (Step 4).

Since the UE indiscriminately encrypts the Requested NSSAI, it is not feasible to distinguish over-the-air whether the UE is requesting a privacy sensitive or privacy insensitive slice. One potential drawback of doing so is that encryption may not be allowed in some regulations. Banned or restricted use of encryption could mean that the Requested NSSAI is not protected over-the-air. Hence, in the following we will describe a new mechanism of addressing the privacy issue related to slice selection by the UE, without for the same purpose using encryption techniques for encryption of a part, or the whole, of an over-the-air message.

In some embodiments described below, the UE sends a UE specific slice-pseudonym over-the-air to indicate a requested slice. The UE specific slice-pseudonym is some form of alias specific to the UE that the HN can map to the requested slice. The mapping of the UE specific slice-pseudonym to the requested slice is known only to the UE and the HN. Therefore, an attacker over-the-air does not know which slice is being requested by the UE. However, it also means that the VN does not know the mapping and therefore needs assistance from the HN. We will further describe our proposed solution in the following. Note that Requested pseudo-NSSAI corresponds to a Requested NSSAI where pseudonyms are used. The UE specific slice-pseudonym could be implemented in various ways as follows (mind that the following variations are given for example rather than to limit the invention):
(1) certain combination of S-NSSAIs are assigned a certain pseudonym so that a Requested NSSAI is replaceable by a pseudonym; or
(2) certain combination of S-NSSAIs are assigned a certain pseudonym so that a Requested pseudo-NSSAI contain a pseudonym instead of list of S-NSSAIs; or
(3) certain combination of SSTs and SDs are assigned a certain pseudonym so that a Requested pseudo-NSSAI contains the list of pseudonyms instead of list of S-NSSAIs; or
(4) certain combination of SSTs and SDs are assigned a certain pseudonym so that a Requested pseudo-NSSAI contains the list of S-NSSAIs, but an individual S-NSSAI contains a pseudonym instead of SST and SD; or
(5) certain SD is assigned a certain pseudonym so that a Requested pseudo-NSSAI contains a list of S-NSSAIs, but an individual S-NSSAI contains SST and the assigned certain pseudonym for the SD; etc.

Figure 3:
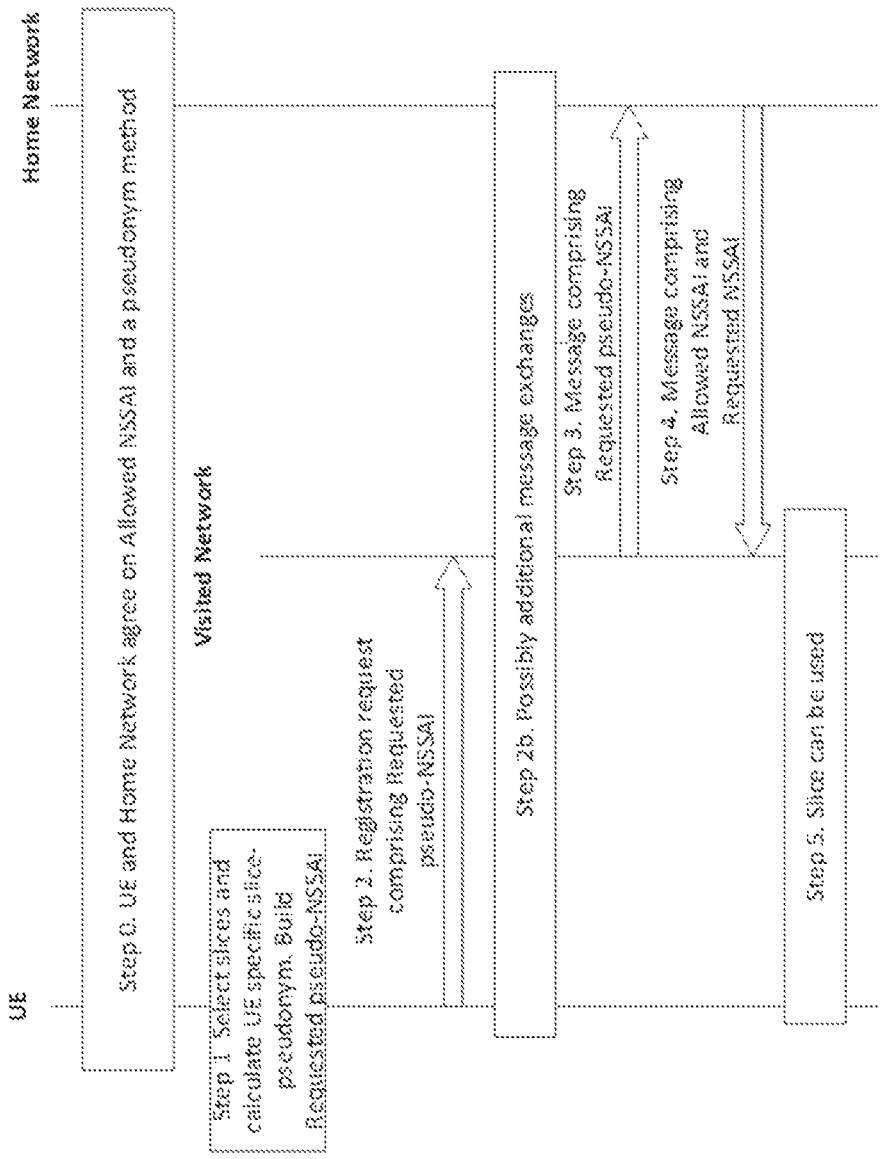
FIG. 3 illustrates a method according to one embodiment.

FIG. 3 illustrates one possible solution. The description of the steps follows, where the description assumes the way as shown as (3) above. However, any combination of S-NSSAIs, combination of SSTs and SDs, or SD can be considered a network slice, to which a pseudonym can be allocated.

FIG. 3 shows messages being transmitted between a wireless device (UE), home network (HN) and visited network (VN). As is conventional, the UE can be considered to consist of a Mobile Equipment (ME) part and a Universal Integrated Circuit Card (UICC).

It is possible that there are multiple nodes within the HN and the VN that are virtualized. One can imagine a privacy node/device or UDM within the HN that is responsible for resolving the NSSAI pseudonym. There could also be a separate node within the VN that receives the list of allowed NSSAIs or that queries the privacy node within the HN.

In step 0 of FIG. 3, the UE and HN agree the Allowed NSSAI and a mapping between slices and UE specific slice-pseudonyms. It should be noted that, in general, the method of mapping is agreed in advance between the UE and the HN, that is, before the UE needs to request use of any slices. How this mapping is created and how conversion in both directions is done is described in the section "Methods for mapping between slice and UE specific slice-pseudonym". One possible method is that the HN selects the method-for-mapping and creates the mapping. The selected method-for-mapping and the created mappings are then provisioned to the UE, for example together with the subscription credentials. The UE may in some embodiments be informed of the mapping through the IMSI. The allowed NSSAI might be updated through some messaging between the HN and the UE via the VN.

The Allowed NSSAI may for example be stored in a UICC of the UE.

Step 1: The UE first decides which slice or slices it will want to request. In order to select or identify at least one network slice to be requested, the UE may use what is called the UE Route Selection Policy (URSP). The URSP is the policy that dictates how an outgoing traffic is routed. It is the home network (HN) that provisions the UE with the URSP. Therefore, the UE can select one or more slice based on a detected application and whether the outgoing traffic belongs to one or another network slice(s). The content of the URSP could include among other things application identifiers and Internet Protocol (IP) descriptors such as destination IP address, destination port number, protocol identifier, etc. The UE then calculates the UE specific slice-pseudonyms for these decided slices. This calculation is done by using the provisioned method-for-mapping and the mapping from Step 0. The calculation of the pseudonyms may be performed in the ME part of the UE. Alternatively, the calculation of the pseudonyms may be performed in the UICC part of the UE. These calculated UE specific slice-pseudonyms are gathered into the Requested pseudo-NSSAI.

Step 2: The UE sends the Requested pseudo-NSSAI to the VN/a device in the VN in the Registration request. The VN/device in the VN receives the Registration request along with the Requested pseudo-NSSAI.

Step 2b: There might occur additional communication between the UE and the VN/device(s) in the VN, the UE and the HN/device(s) in the HN and between the VN/device(s) in the VN and the HN/devices in the HN. This communication could for example be parts of authentication or service negotiations. This optional communication may comprise one or more of the steps 4-9a of FIG. 4.2.2.2.2-1 of 3GPP TS 23.502 V1.2.0 in case an AMF needs the SUPI and/or the UE's subscription information to decide whether to reroute a registration request from the UE to another AMF or if the Registration request was not sent integrity protected or integrity protection is indicated as failed. This is also illustrated in the figure in the appendix, part 3.2 "Registration procedure with AMF relocation".

Step 3: The VN sends the Requested pseudo-NSSAI to the HN/a device in the HN, such as a separate privacy node.

Step 4: The HN/device in the HN calculates the Requested NSSAI from the Requested pseudo-NSSAI. This is done by using the method-for-mapping and the mapping from Step 0. The HN sends the Allowed NSSAI along with the Requested NSSAI to the VN/a device in the VN. The VN/device in the VN receives the Requested NSSAI from the HN/a device in the HN.

Step 5: The VN is now able to provide the UE access to the slices that the UE wants to request.

It should also be mentioned that in some embodiments, an Authentication and Key Agreement (AKA), e.g. 5G AKA or UMTS AKA needs to have been finished before an Allowed NSSAI is provided to the VN from the HN in order to ensure that the correct UE is present and authenticated before disclosing information to the VN.

Alternatively, a variation of the above would be that the VN/a device in the VN stores the Requested pseudo-NSSAI (in Step 2) and does not provide the HN with the Requested pseudo-NSSAI in Step 3. Instead the HN/device in the HN sends the method-for-mapping and the mapping to the VN/device in the VN in Step 4. After this the VN itself uses the provided method-for-mapping and the mapping to calculate the Requested NSSAI from the Requested pseudo-NSSAI.

The method is also applicable where the wireless device requests a network slice from its home network by forming a slice pseudonym for the or each network slice to be requested and transmitting a request message to the network, wherein the request message comprises the or each slice pseudonym. The home network then receives the request message, wherein the request message comprises at least one received slice pseudonym, and, based on a mapping method used by the wireless device that is specific to the wireless device, identifies at least one requested network slice from the or each received slice pseudonym.

Methods for mapping between slice identifier and UE specific slice-pseudonyms:

Now, we describe various variants of the method-for-mapping. Note that we denote the Allowed NSSAI as L, the slice identifier as n and the UE specific slice-pseudonyms p.

Variant 1 of the method-for-mapping:

In this variant, a one-to-one mapping is generated between a UE specific slice-pseudonym and an S-NSSAI for each S-NSSAI in the set of Allowed NSSAIs. For example, if the Allowed NSSAI is a list of {S-NSSAI_1, S-NSSAI_2, S-NSSAI_3}, then the one-to-one mapping, called the mapping, is generated with random numbers for each S-NSSAI, e.g. 156<->S-NSSAI_1, 33<->S-NSSAI_2, 1087<->S-NSSAI_31. In this example, the 56 is the UE specific slice-pseudonym for S-NSSAI_1, the 33 is for S-NSSAI_2, and the 1087 is for S-NSSAI_3.

From slice identifier to UE specific slice-pseudonym:

A UE specific slice-pseudonym from the mapping is retrieved by using an S-NSSAI. For the example above, a UE specific slice-pseudonym for the S-NSSAI_3 is retrieved as 1087 from the mapping.

From UE specific slice-pseudonym to slice identifier:

An S-NSSAI from the mapping is retrieved by using a UE specific slice-pseudonym. For the example above, an S-NSSAI for the UE specific slice-pseudonym 33 is retrieved as S-NSSAI_2 from the mapping.

Variant 2 of the method-for-mapping:

The list of Allowed NSSAI is modified to be a randomly ordered list. The index of each S-NSSAI in this list is the basis of how to convert between a slice identifier and a pseudonym. Using the index in the list as pseudonym directly would be a one-to-one mapping and could leak information on how many slices are available. It would also leak information on when a single slice is used multiple times. Therefore, we enrich this with a modulus method to ensure a many-to-one mapping.

We denote a % b as the modulo operation applied to a and b where a is the dividend and b is the divisor. We define $L[i]$ to be the i:th element in L where $L[0]$ is the first element in L. L.index(n) is defined to be the index of the element n in L. That is, $L[L.index(n)]=n$. Finally, len(L) is the number of elements in L.

From slice identifier to UE specific slice-pseudonym:

A random integer r is chosen. The slice pseudonym p for the network slice to be requested is then formed from said index value by adding to the index value a product of a random integer and a predetermined multiplicand that is greater than or equal to the number of network slices that are allowed for use by the wireless device. In this example, the number of allowed slices, len(L), is used as the predetermined multiplicand. Thus: $p=L.index(n)+r*len(L)$ The random integer r ensures that the value of p is non-deterministic for one slice identifier while the multiplication with len(L) ensures that the slice identifier can be retrieved from the UE specific slice-pseudonym.

From UE specific slice-pseudonym to slice identifier. The network node calculates the slice identifier, by performing a modulo operation on the pseudonym, using the same predetermined integer. Thus: $n=L[p\ \%\ len(L)]$ To walk through why this works we step through the equation from slice identifier via UE specific slice-pseudonym back to slice identifier.

Instead of p we plug in the formula for generating the UE specific slice-pseudonym. $n=L[(L.index(n)+r*len(L))\%\ len(L)]$ As $r*len(L)$ is a multiple of len(L) this is removed by the modulo operation. As L.index(n) is the only component that is not a multiple of len(L) this remains untouched.

This results in $n=L[L.index(n)]$, which matches our definition.

Variant 3 of the method-for-mapping:

As in variant 1, in this variant, a one-to-one mapping is generated between a UE specific slice-pseudonym and an S-NSSAI for each S-NSSAIs in the Allowed NSSAI. For example, if the Allowed NSSAI is a list of {S-NSSAI_1, S-NSSAI_2, S-NSSAI_3}, then the one-to-one mapping, called the mapping, is generated with random numbers for each S-NSSAIs, e.g. {56<->S-NSSAI_1, 33<->S-NSSAI_2, 1087<->S-NSSAI_3}. In this example, the 56 is the UE specific slice-pseudonym for S-NSSAI_1, the 33 is for S-NSSAI_2, and the 1087 is for S-NSSAI_3. In addition, yet another randomization is introduced as follows.

From slice identifier to UE specific slice-pseudonym:

A first UE specific slice-pseudonym from the mapping is retrieved by using an S-NSSAI. For the example in the paragraph above, a first UE specific slice-pseudonym for the S-NSSAI_2 is retrieved as 33 from the mapping. Next, a second UE specific slice-pseudonym from the mapping is retrieved which is smallest among the ones with values higher than the first UE specific slice-pseudonym. In the above example, a second UE specific slice-pseudonym is retrieved as 56. Next, a third UE specific slice-pseudonym is chosen as a random integer between the first (inclusive) and the second (exclusive) UE specific slice-pseudonym. For the example above, a third UE specific slice-pseudonym is retrieved as a random number which is greater or equal to 33 and less than 56, say 45. This third UE specific slice-pseudonym 45 is used to indicate the S-NSSAI_2.

From UE specific slice-pseudonym to slice identifier:

A fourth UE specific slice-pseudonym is chosen from the mapping which is greatest among the ones whose value is less than or equal to the third UE specific slice-pseudonym, i.e. the 45. For the example above, the fourth UE specific slice-pseudonym is 33. Next, an S-NSSAI from the mapping is retrieved by using the fourth UE specific slice-pseudonym. For the example above, an S-NSSAI for the UE specific slice-pseudonym 33 is retrieved as S-NSSAI_2.

Other mapping methods can be used, for obtaining pseudonyms from slice identifiers. In some embodiments, the method used for generating the pseudonyms is a one-to-many mapping. Thus, any given slice identifier can give rise to different pseudonyms. However, the method for obtaining pseudonyms slice identifiers from pseudonyms is a many-to-one mapping. Thus, the original slice identifier can be obtained from any one of the possible pseudonyms.

In addition, the details of the mapping method are specific to a particular wireless device. Thus, two wireless devices, requesting the same slice identifier, may generate different pseudonyms for that slice identifier.

With respect to all the above disclosed embodiments, above mentioned request message which contains the pseudo-NSSAI may in some embodiments be a NSSAI-NAS request (Requested NSSAI-NAS) or a NSSAI-RRC request (Requested NSSAI-RRC). Also, for extra security, but generally contrary to the advantages of the above disclosed embodiments that utilize a pseudo-NSSAI, the request message including the pseudo-NSSAI, may of course be encrypted by the UE using e.g. a HN public key stored in the UE.

Figure 4:
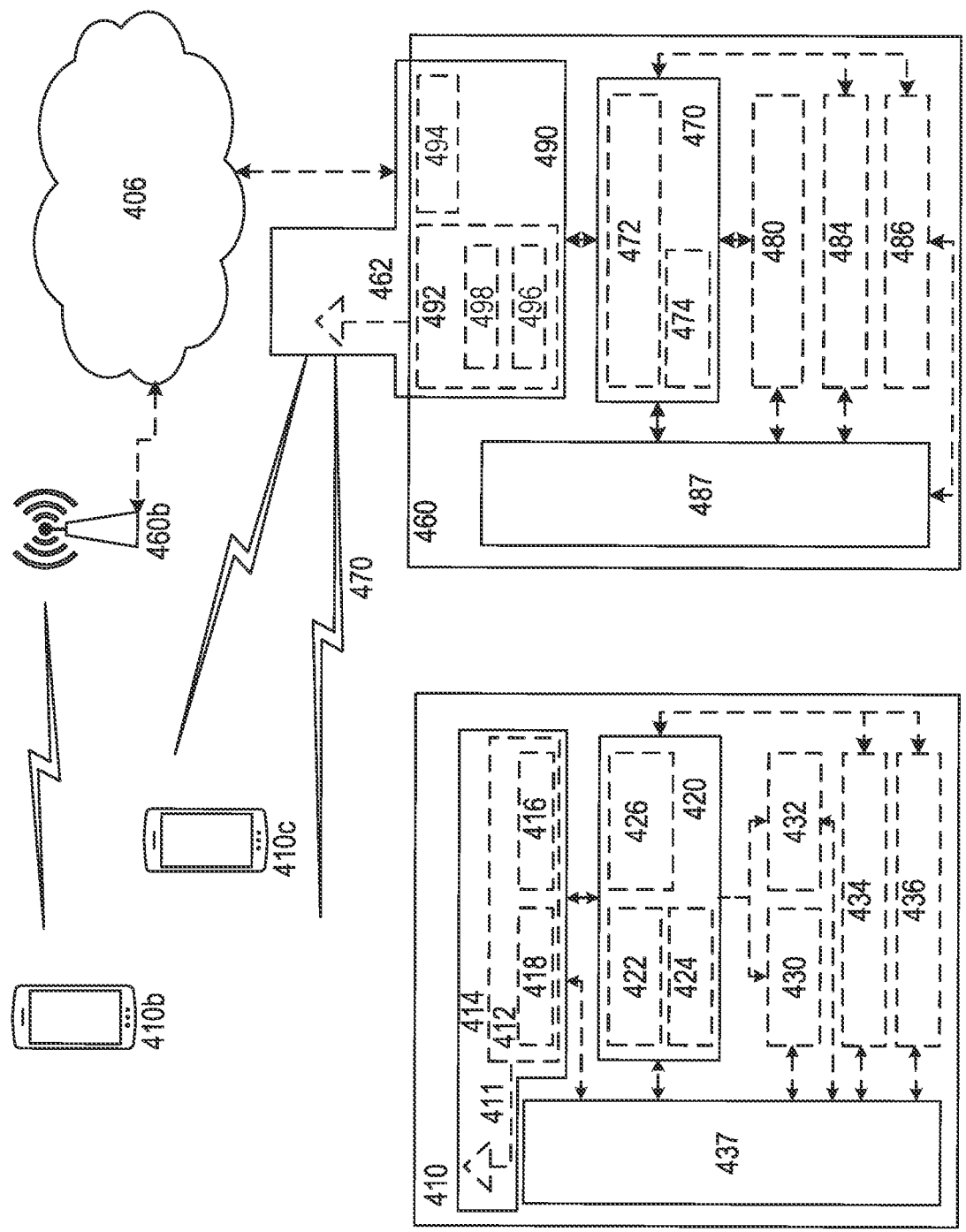
FIG. 4 shows an example of a wireless network in accordance with some embodiments.

FIG. 4 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs, AMFs), O&M nodes, OSS nodes, SON nodes, positioning nodes (e.g., E-SMLCs), and/or MDTs. Still another example of a network node with respect to the embodiments herein is privacy node/privacy device in the HN with a privacy function for the method-for-mapping as described above. Another example is a Unified Data Management node, UDM. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on computer readable storage medium such as the device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

A computer program product in the form of a computer readable storage medium, such as the device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Computer readable storage medium 480 may store any suitable instructions, data or information, including a computer program, software, an application including one or more of logic, rules, code, tables, etc. and/or other instructions capable of being executed by processing circuitry 470 and, utilized by network node 460. Computer readable storage medium 480 may be used to store any calculations made by processing circuitry 470 and/or any data received via interface 490. In some embodiments, processing circuitry 470 and computer readable storage medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable storage medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable storage medium 430, WD 410 functionality. Such functionality may include providing any of the various wireless features or benefits discussed herein. For example, processing circuitry 420 may execute instructions stored in device readable storage medium 430 or in memory within processing circuitry 420 to provide the functionality disclosed herein. The processing circuitry 420 may in one embodiment also comprise an iUICC, on which e.g. SIM functionality and a key shared with the HN is stored.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable storage medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable storage medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
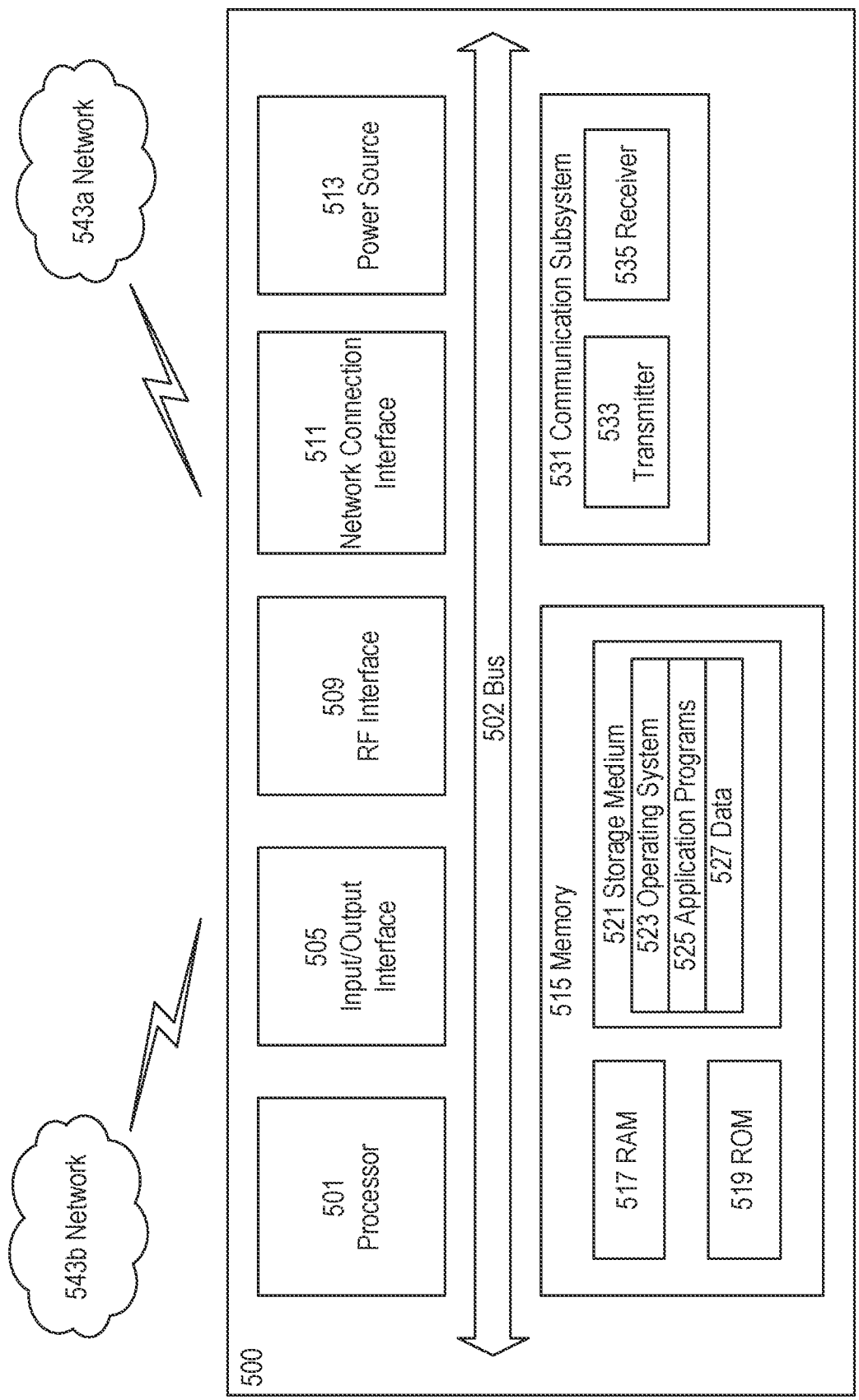
FIG. 5 shows an example of a User Equipment in accordance with some embodiments.

FIG. 5 shows an example of a User Equipment in accordance with some embodiments

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3rd Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer. The processing circuitry 501 may in some embodiment comprise an iUICC.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium. In some embodiments, even the memory of a removable or embedded UICC may be utilized for storing of data.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
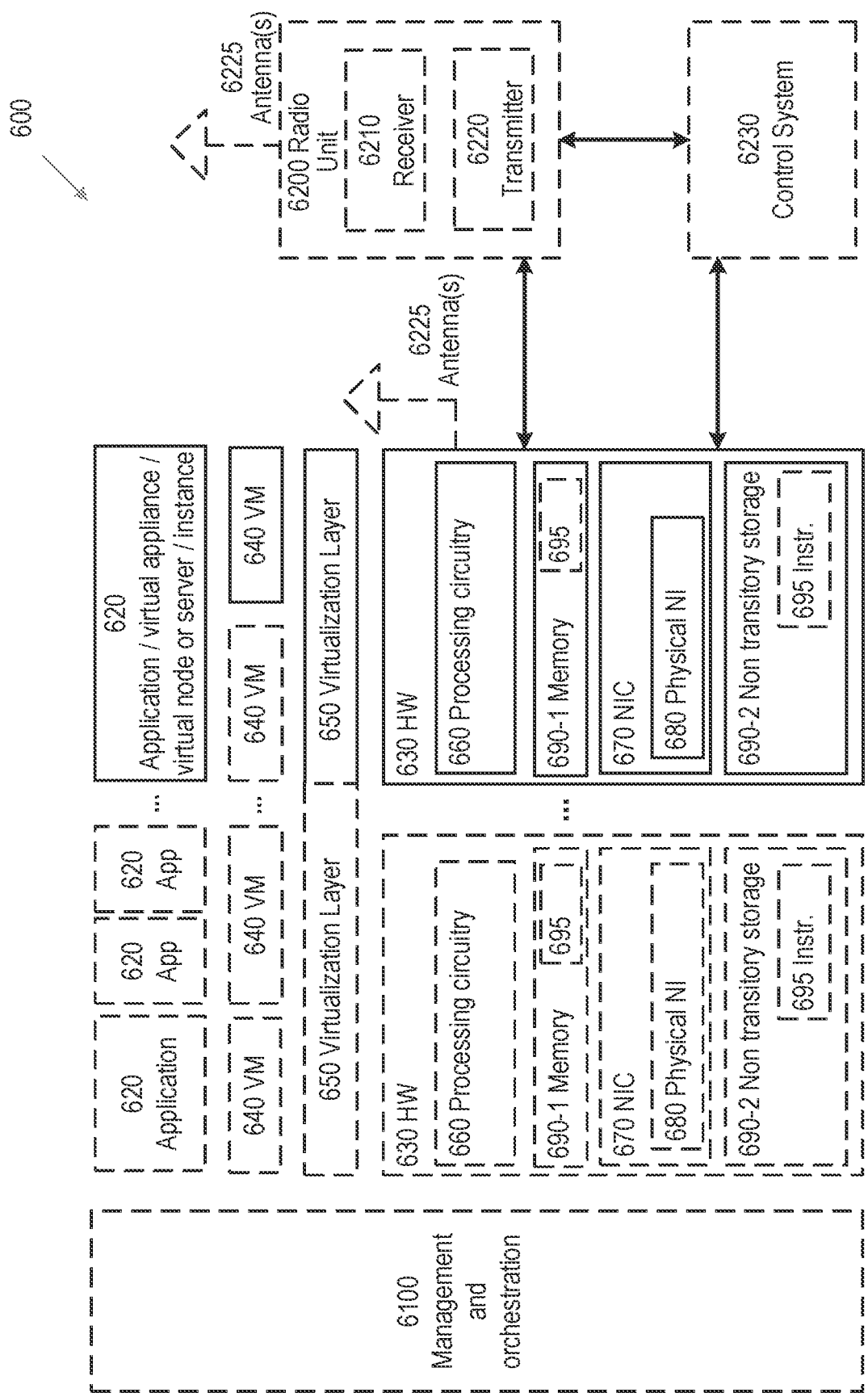
FIG. 6 illustrates a virtualization environment in accordance with some embodiments.

FIG. 6 illustrates a virtualization environment in accordance with some embodiments FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
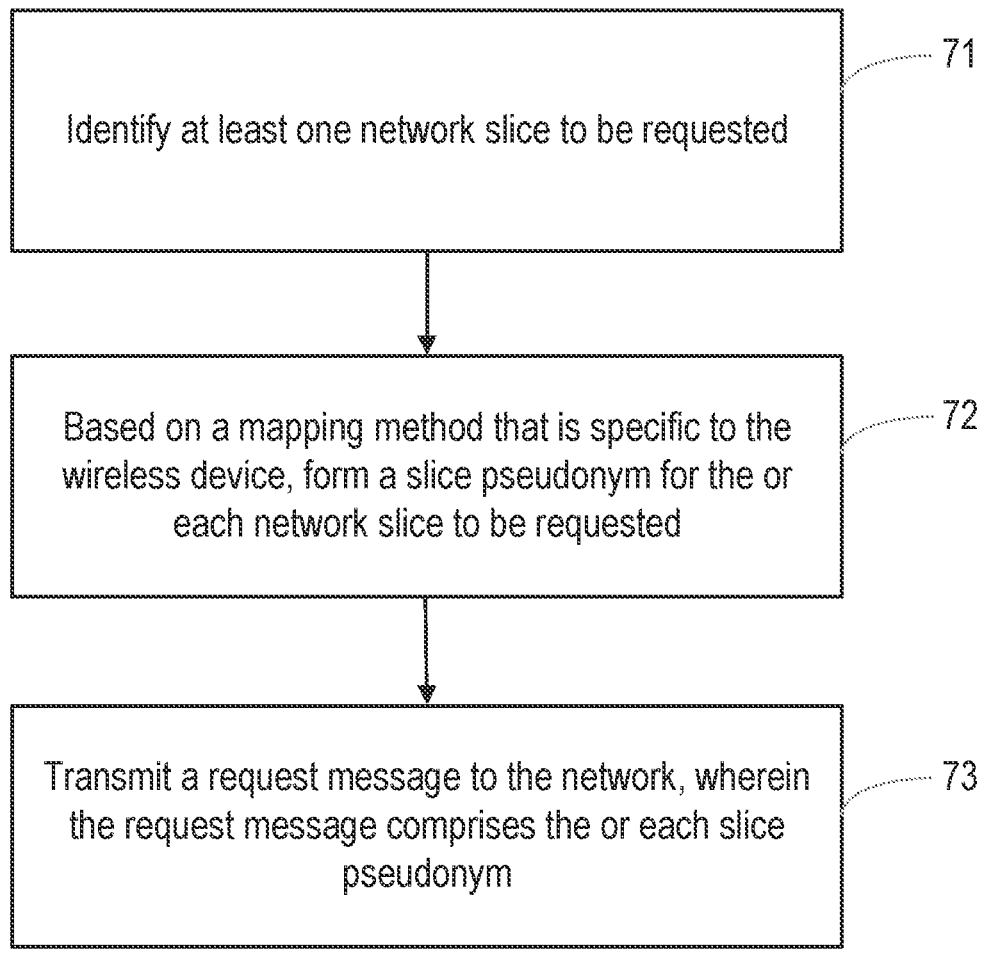
FIGS. 7, 8 and 9 illustrate methods in accordance with certain embodiments.

FIG. 7 depicts a method in accordance with particular embodiments. Specifically, the method is performed by a wireless device for requesting a network slice from a network. The method includes step 71 in which the wireless device identifies at least one network slice to be requested. Based on a mapping method that is specific to the wireless device, at step 72 the wireless device forms a slice pseudonym for the or each network slice to be requested. At step 73, the wireless device transmits a request message to the network, wherein the request message comprises the or each slice pseudonym.

Figure 8:
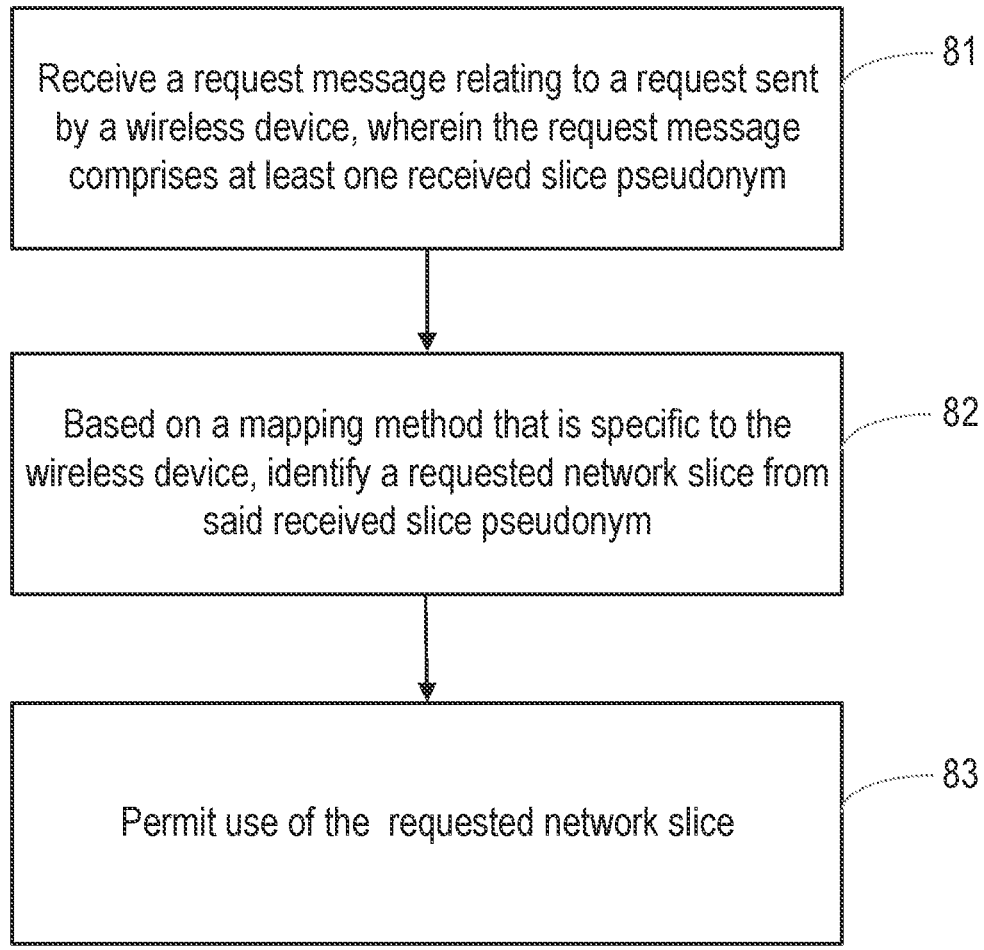

FIG. 8 depicts a method in accordance with particular embodiments. Specifically, the method is performed by a network node, e.g. a privacy node or privacy function or a UDM in a HN, for allocating a network slice to a wireless device. The method includes step 81, in which the network node receives a request message relating to a request sent by a wireless device, wherein the request message comprises at least one received slice pseudonym. At step 82, based on a mapping method used by the wireless device that is specific to the wireless device, the network node identifies at least one requested network slice from the or each received slice pseudonym. Thereafter, at step 83, the network node permits use of the requested network slice.

Figure 9:
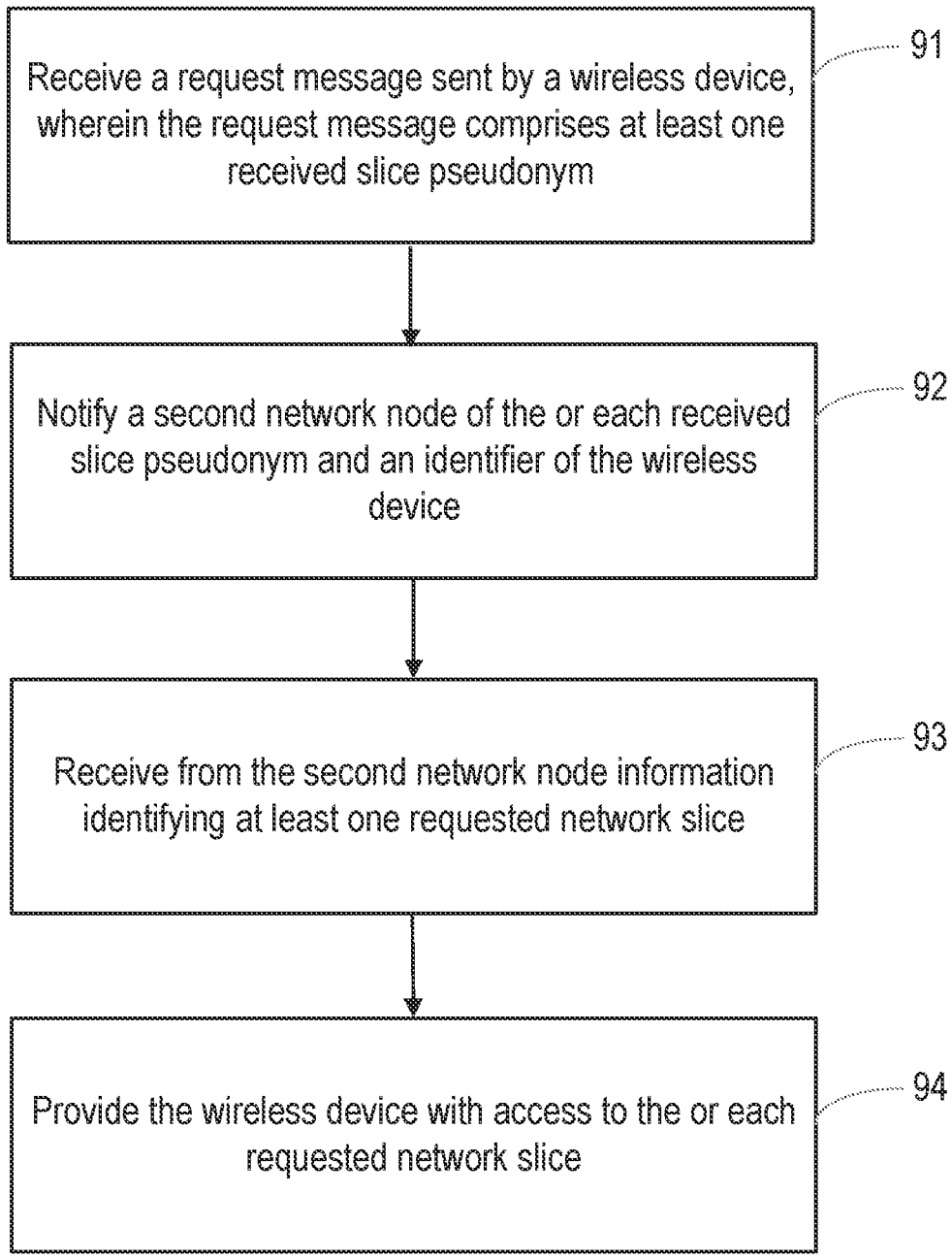

FIG. 9 depicts a method in accordance with particular embodiments. Specifically, the method is performed by a network node, e.g. a privacy node or a UDM in a VN, for allocating a network slice to a wireless device. The method includes step 91, in which the network node receives a request message sent by a wireless device, wherein the request message comprises at least one received slice pseudonym. At step 92, the network node notifies a second network node, e.g. a network node, such a s a second privacy node or a second UDM, in a HN, of the or each received slice pseudonym and an identifier of the wireless device. At step 93, the network node receives from the second network node information identifying at least one requested network slice; and, at step 94, the network node provides the wireless device with access to the or each requested network slice.

Figure 10:
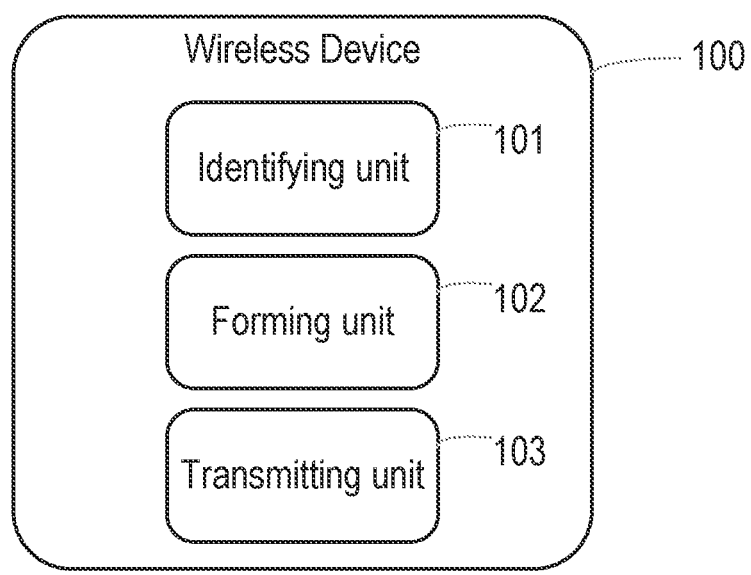
FIG. 10 illustrates a wireless device in accordance with certain embodiments.

FIG. 10 illustrates a schematic block diagram of an apparatus 100 in a wireless network (for example, the wireless network shown in FIG. 4). The apparatus may be implemented in a wireless device (e.g., wireless device 410). Apparatus 100 is operable to carry out the example method described with reference to FIG. 7 and possibly any other processes or methods disclosed herein. It is also to be understood that the method of FIG. 7 is not necessarily carried out solely by apparatus 100. At least some operations of the method can be performed by one or more other entities.

Apparatus 100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause identifying unit 101, forming unit 102, transmitting unit 103, and any other suitable units of apparatus 100 to perform corresponding functions according one or more embodiments of the present disclosure.

As illustrated in FIG. 10, apparatus 100 includes an identifying unit 101 for identifying at least one network slice to be requested; a forming unit 102, for, based on a mapping method that is specific to the wireless device, forming a slice pseudonym for the or each network slice to be requested; and a transmitting unit 103, for transmitting a request message to the network, wherein the request message comprises the or each slice pseudonym.

Figure 11:
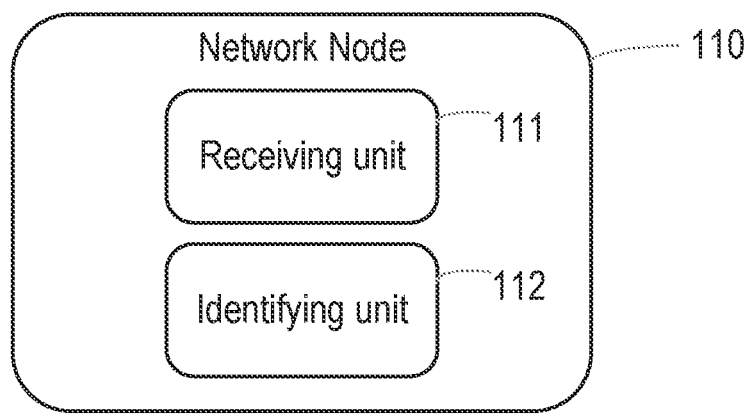
FIGS. 11 and 12 illustrate network nodes in accordance with certain embodiments.

FIG. 11 illustrates a schematic block diagram of an apparatus 110 in a wireless network (for example, the wireless network shown in FIG. 4). The apparatus may be implemented in a network node (e.g., network node 460 shown in FIG. 4). Apparatus 110 is operable to carry out the example method described with reference to FIG. 8 and possibly any other processes or methods disclosed herein. It is also to be understood that the method of FIG. 8 is not necessarily carried out solely by apparatus 110. At least some operations of the method can be performed by one or more other entities.

Apparatus 110 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 111, identifying unit 112, and any other suitable units of apparatus 110 to perform corresponding functions according one or more embodiments of the present disclosure.

As illustrated in FIG. 11, apparatus 110 includes a receiving unit 111, for receiving a request message relating to a request sent by a wireless device, wherein the request message comprises at least one received slice pseudonym; and an identifying unit 112, for, based on a mapping method used by the wireless device that is specific to the wireless device, identifying at least one requested network slice from the or each received slice pseudonym.

Figure 12:
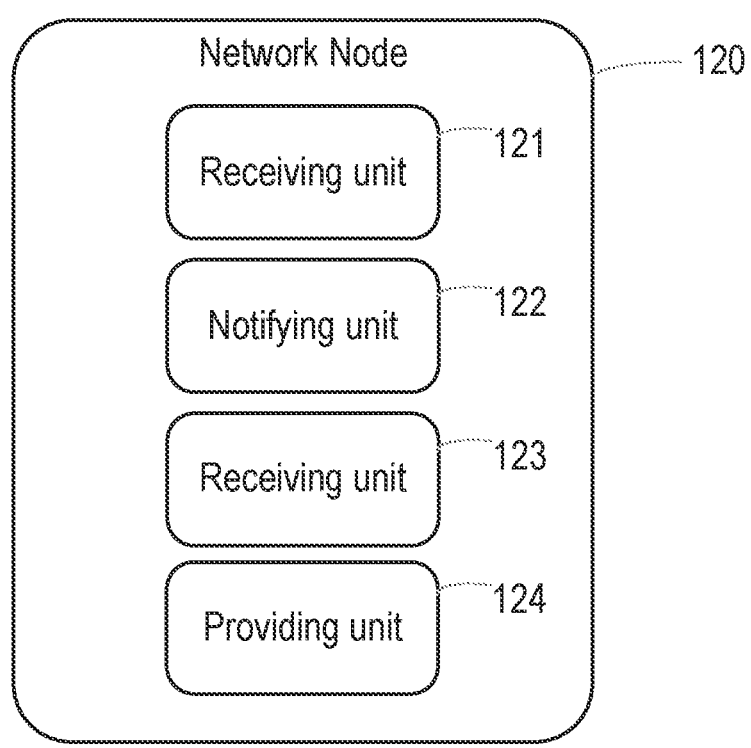

FIG. 12 illustrates a schematic block diagram of an apparatus 120 in a wireless network (for example, the wireless network shown in FIG. 4). The apparatus may be implemented in a network node (network node 460 shown in FIG. 4). Apparatus 120 is operable to carry out the example method described with reference to FIG. 9 and possibly any other processes or methods disclosed herein. It is also to be understood that the method of FIG. 9 is not necessarily carried out solely by apparatus 120. At least some operations of the method can be performed by one or more other entities.

Apparatus 120 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 121, notifying unit 122, receiving unit 123, providing unit 124, and any other suitable units of apparatus 120 to perform corresponding functions according one or more embodiments of the present disclosure.

As illustrated in FIG. 12, apparatus 120 includes a receiving unit 121, for receiving a request message sent by a wireless device, wherein the request message comprises at least one received slice pseudonym; a notifying unit 122, for notifying a second network node of the or each received slice pseudonym and an identifier of the wireless device; a receiving unit 123, for receiving from the second network node information identifying at least one requested network slice; and a providing unit 124, for providing the wireless device with access to the or each requested network slice.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).
- 1×RTT CDMA2000 1× Radio Transmission Technology
- 3GPP 3rd Generation Partnership Project
- 5G 5th Generation
- ABS Almost Blank Subframe
- AMF Core Access and Mobility Management Function
- ARQ Automatic Repeat Request
- AUSF Authentication Server Function
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CP Cyclic Prefix
- CPICH Common Pilot Channel
- CPICH Ec/No
- CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DNN Data Network Name
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eNB E-UTRAN NodeB
- ePDCCH enhanced Physical Downlink Control Channel
- E-SMLC evolved Serving Mobile Location Center
- E-UTRA Evolved UTRA
- E-UTRAN Evolved UTRAN
- FDD Frequency Division Duplex
- FFS For Further Study
- GERAN GSM EDGE Radio Access Network
- gNB Base station in NR
- GNSS Global Navigation Satellite System
- GSM Global System for Mobile communication
- GUTI Globally Unique temporary Identifier
- IMSI International Mobile Subscriber Identity
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Message Authentication Code
- MBMS Multimedia Broadcast Multicast Services
- MBSFN Multimedia Broadcast multicast service Single Frequency Network
- MBSFN ABS MBSFN Almost Blank Subframe
- MCC Mobile Country Code
- MDT Minimization of Drive Tests
- ME Mobile Equipment
- MIB Master Information Block
- MME Mobility Management Entity
- MNC Mobile Network Code
- MSC Mobile Switching Center
- NAI Network Access Identifier
- NPDCCH Narrowband Physical Downlink Control Channel
- NR New Radio
- NRF Network Repository Function
- NSSAI Network Slice Selection Assistance Information
- NSSF Network Slice Selection Function
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCF Policy Control Function
- PCFICH Physical Control Format Indicator Channel
- PDCCH Physical Downlink Control Channel
- PDP Profile Delay Profile
- PDSCH Physical Downlink Shared Channel
- PEI Permanent Equipment Identifier
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PSS Primary Synchronization Signal
- PUCCH Physical Uplink Control Channel
- PUSCH Physical Uplink Shared Channel
- RACH Random Access Channel
- QAM Quadrature Amplitude Modulation
- QoE Quality of Experience
- RAN Radio Access Network
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power
- RSRP Reference Symbol Received Power OR Reference Signal Received Power
- RSRQ Reference Signal Received Quality OR Reference Symbol Received Quality
- RSSI Received Signal Strength Indicator
- RSTD Reference Signal Time Difference
- S-NSSAI Single Network Slice Selection Assistance Information
- SCH Synchronization Channel
- SCell Secondary Cell
- SDU Service Data Unit
- SEAF Security Anchor Function
- SFN System Frame Number SGW Serving Gateway
SI System Information
SIB System Information Block
SMF Session Management Function
SNR Signal to Noise Ratio
SON Self Optimized Network
SS Synchronization Signal
SSS Secondary Synchronization Signal
SUPI Subscription Permanent Identifier
TDD Time Division Duplex
TDOA Time Difference of Arrival
TOA Time of Arrival
TSS Tertiary Synchronization Signal
TTI Transmission Time Interval
UDM Unified Data Management
UDR Unified Data Repository
UE User Equipment
UL Uplink
UMTS Universal Mobile Telecommunication System
UICC Universal Integrated Circuit Card
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for requesting use of a network slice from a network, the method comprising:
   identifying at least a first network slice to be requested;
   based on a mapping method that is specific to the wireless device, forming a first network slice pseudonym for the first network slice to be requested; and
   transmitting a request message to the network, wherein the request message comprises the first network slice pseudonym.

2. The method of claim 1, wherein
   a set of one or more network slices are allowed for use by the wireless device, and
   using the mapping method to generate a slice pseudonym for every network slice included in the set.

3. The method of claim 1, wherein the mapping method comprises a one-to-one mapping step that is known in advance to the wireless device.

4. The method of claim 3, wherein the mapping method comprises:
   performing a one-to-one mapping between a network slice identifier of the first network slice and the first network slice pseudonym for said first network slice, wherein the first network slice pseudonym for said first network slice is specific to the wireless device.

5. The method of claim 3, wherein the mapping method comprises:
   performing a one-to-one mapping between a network slice identifier of the first network slice and a first slice number associated with said first network slice,
   determining a second slice number associated with a second network slice, and
   selecting a slice pseudonym as a number between the first slice number and the second slice number.

6. The method of claim 3, wherein
   the first network slice is associated with an index value, and
   forming the first network slice pseudonym for the first network slice comprises adding to the index value a product of a random integer and a predetermined multiplicand that is greater than or equal to a number of network slices that are allowed for use by the wireless device.

7. The method of claim 6, wherein the predetermined multiplicand is equal to the number of network slices that are allowed for use by the wireless device.

8. The method of claim 1, further comprising agreeing on the mapping method with a home network of the wireless device or a network node of the home network of the wireless device.

9. The method of claim 1, further comprising receiving information about the mapping method from a home network of the wireless device or a network node of the home network of the wireless device.

10. The method of claim 1, further comprising:
    receiving a message transmitted by a network node in the network, the message comprising a set of network slice identifiers, wherein each network slice identifier included in the set identifies a different network slice, and the message conveys information for enabling the communication device to obtain, for each identified network slice, a network slice pseudonym for the network slice, wherein the network slice pseudonym for the network slice is different than the network slice identifier that identifies the network slice, wherein
    the set of network slice identifiers includes a first network slice identifier that identifies the first network slice.

11. A method performed by a network node, for allocating one or more network slices to a wireless device, the method comprising:
    receiving a request message relating to a request sent by a wireless device, wherein the request message comprises at least a first network slice pseudonym;
    based on a mapping method used by the wireless device that is specific to the wireless device and the first network slice pseudonym, identifying a first requested network slice; and
    permitting use of the first requested network slice.

12. The method of claim 11, wherein the mapping method comprises a one-to-one mapping step that is known in advance to the wireless device.

13. The method of claim 11, wherein identifying the first requested network slice comprises:
    performing a one-to-one mapping between the first network slice pseudonym and a network slice identifier of the first requested network slice, wherein the first network slice pseudonym for said first requested network slice is specific to the wireless device.

14. The method of claim 11, wherein identifying the first requested network slice:
    the first network slice pseudonym is associated with a first slice number;
    determining a second slice number associated with a second slice pseudonym; and
    using the second slice number to identify the first requested network slice.

15. The method of claim 11, wherein identifying the first requested network slice comprises:
    performing a modulus operation using the first network slice pseudonym and a modulus value to obtain an index value, wherein the modulus value indicates a number of network slices that are allowed for use by the wireless device; and
    performing a one-to-one mapping between said index value and a network slice identifier of the first requested network slice.

16. The method of claim 11, performed in a home network of the wireless device, the method comprising:
- receiving said request message from a network that is being visited by the wireless device; and
- providing the network with the first requested network slice.

17. The method of claim 11, further comprising:
- prior to receiving the request, transmitting to the wireless device a message comprising a set of network slice identifiers, wherein each network slice identifier included in the set identifies a different network slice, and the message conveys information for enabling the communication device to obtain, for each identified network slice, a network slice pseudonym for the network slice, wherein the network slice pseudonym for the network slice is different than the network slice identifier that identifies the network slice.

18. A wireless device, the wireless device comprising:
- processing circuitry configured to perform the steps of claim 1; and
- power supply circuitry configured to supply power to the wireless device.

19. The wireless device of claim 18, wherein
- at least some of said steps are performed in a Mobile Equipment part of the wireless device, or
- at least some of said steps are performed in a Universal Integrated Circuit Card part of the wireless device.

20. A network node, the network node comprising:
- processing circuitry configured to perform the steps of claim 11; and
- power supply circuitry configured to supply power to the network node.

* * * * *